United States Patent Office 3,526,932
Patented Sept. 8, 1970

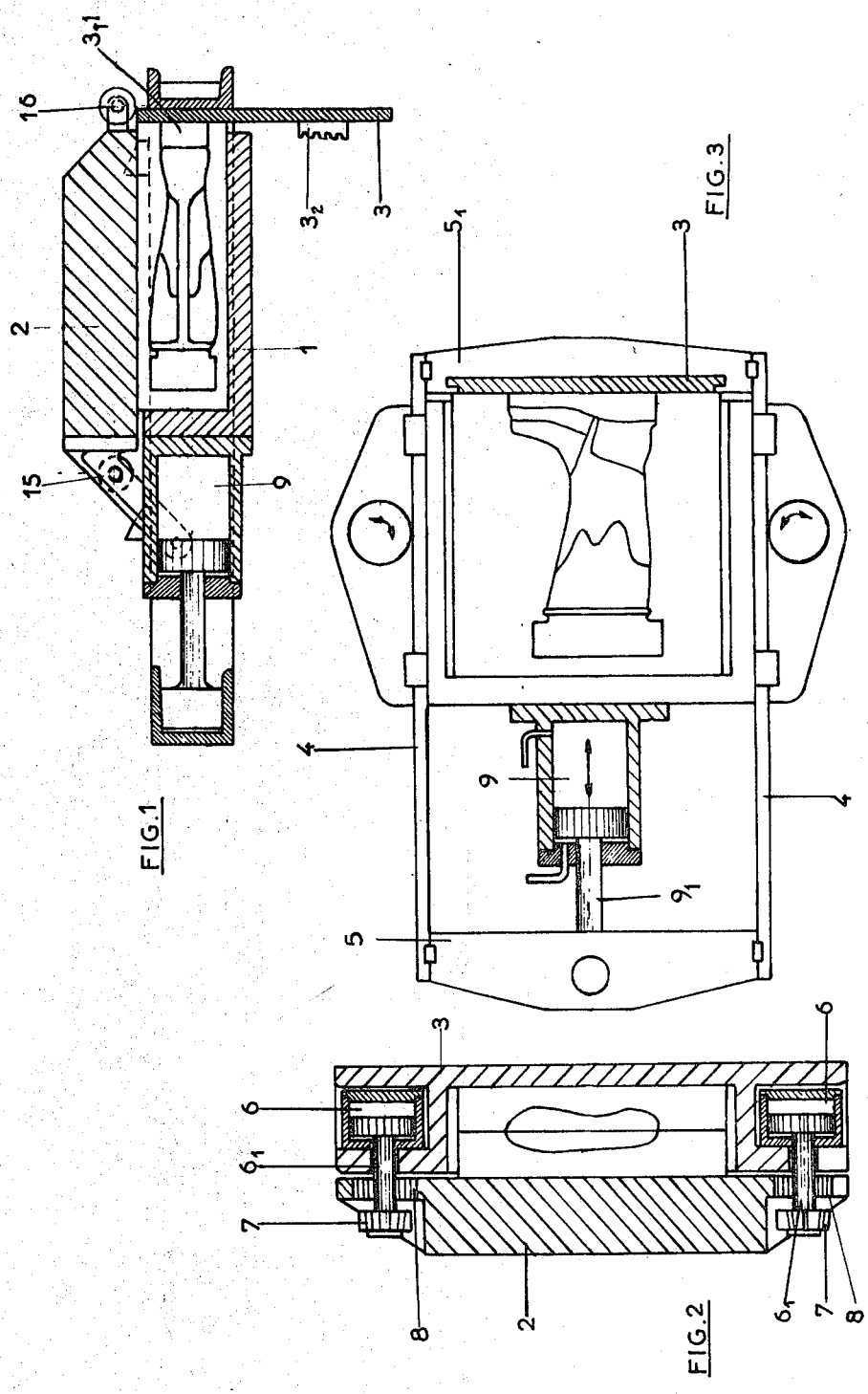

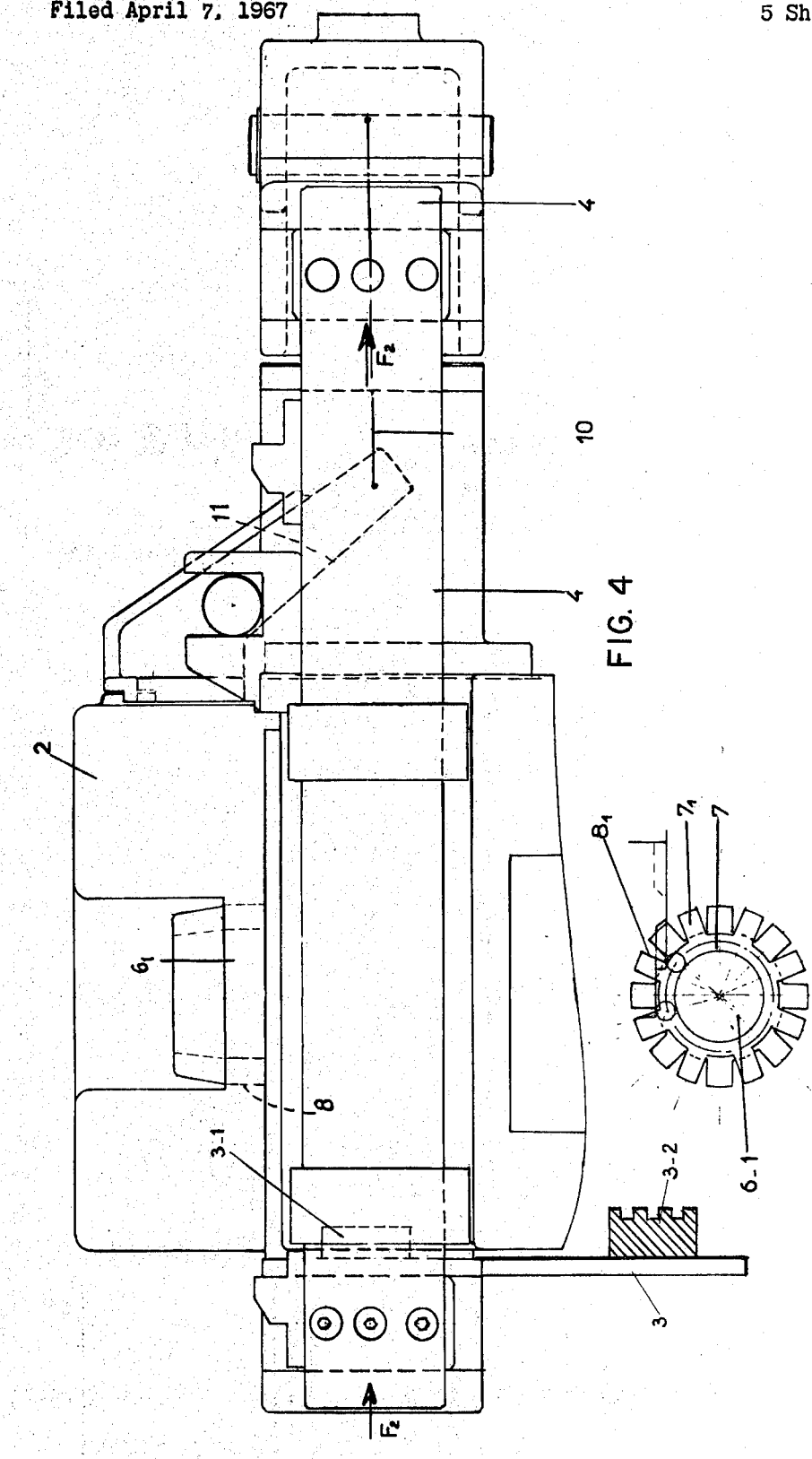

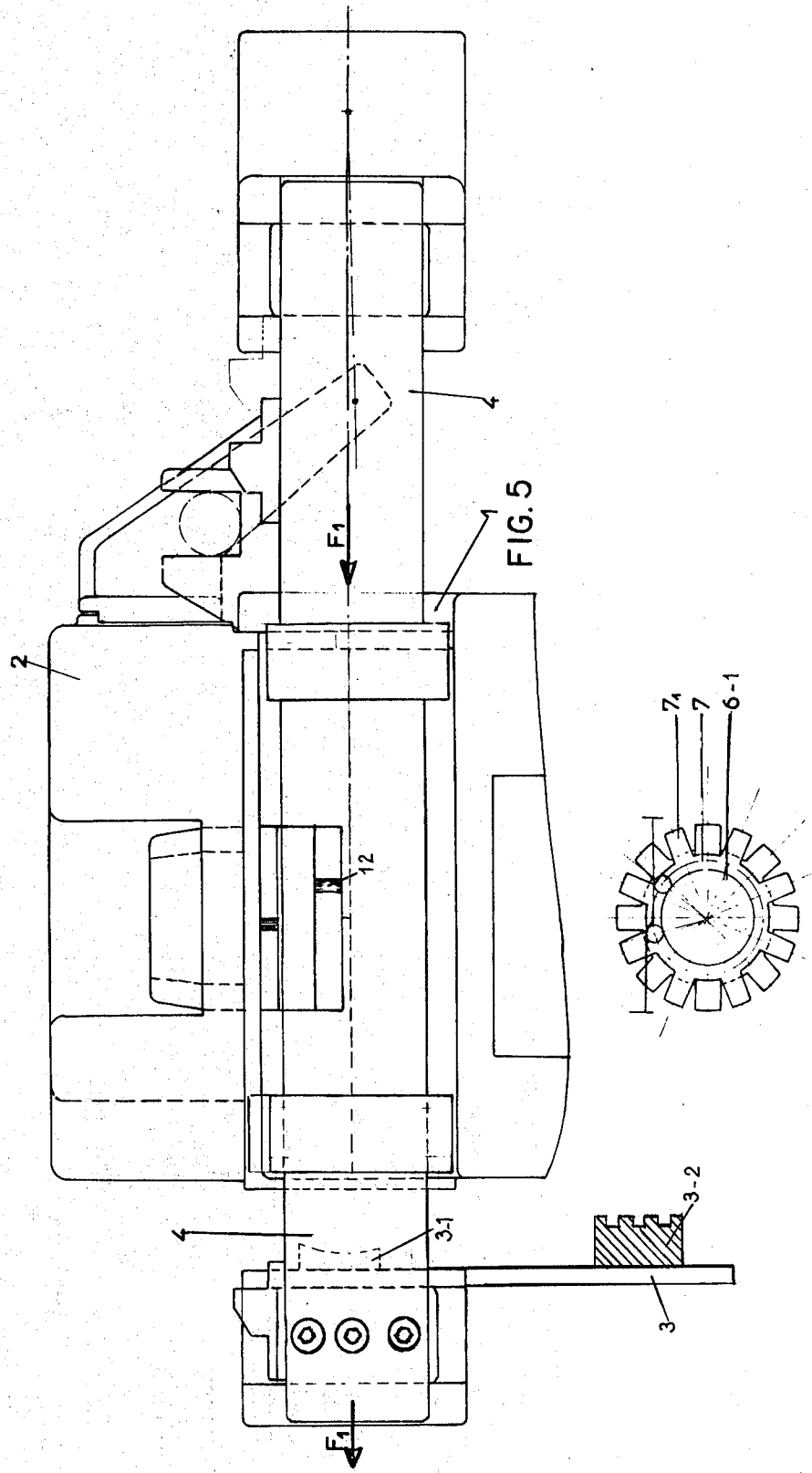

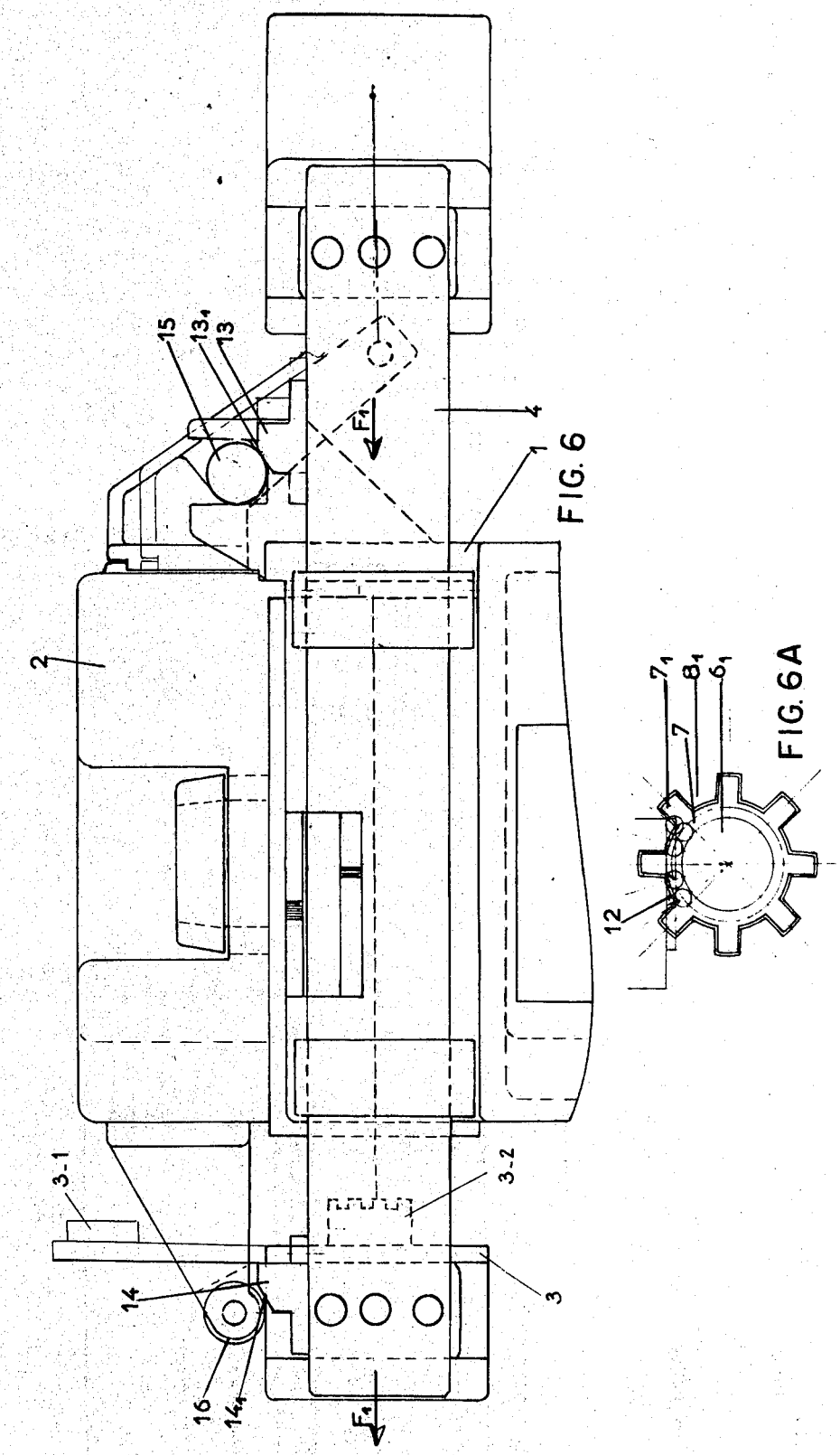

---

3,526,932
MOLD-HOLDER, MORE PARTICULARLY FOR PRODUCING INJECTED ARTICLES, SUCH AS FOOTWEAR ARTICLES OR OTHER APPLICATIONS, AS WELL AS INJECTING MACHINES PROVIDED WITH THIS MOLD-HOLDER OR THE LIKE
Marcel Jezequel and Jean Ovtcharenko, both of 18 Avenue d'Epinay, Colombes, France
Filed Apr. 7, 1967, Ser. No. 629,313
Claims priority, application France, Apr. 28, 1966, 59,548
Int. Cl. B29c 1/00
U.S. Cl. 18—42                      6 Claims

ABSTRACT OF THE DISCLOSURE

The invention relates to a mold-holder, in particular for producing injected articles, such as footwear articles, comprising a fixed plate and a pivoting lid able to close this plate and a lateral closing plate for the fixed plate and its lid, application and locking means for these lids cooperating for ensuring in particular, a safety closing of the mold-holder.

---

The invention has for its object a mold-holder more particularly for producing injected articles, such as footwear articles, comprising a lower fixed plate, a pivoting lid for closing this plate and a lateral lid, a mold-holder in which the fixed plate and pivoting lid are kept closed by two jacks at the sides of the mold, whereas the lateral lid is closed by a jack whose movement, in one direction, effects the closing of the lateral lid and the locking of the application jacks of the pivoting lid on the lower plate, and for the other direction, the opening of the lateral lid, then the unlocking of the lateral jacks and the pre-opening of the top lid.

An example of the carrying out of a mold-holder is shown, by way of example, in the attached drawings, in which:

FIG. 1 is a diagrammatical view showing a longitudinal section of the mold-holder;

FIG. 2 is a cross-sectional view of the mold-holder;

FIG. 3 is a top view in partial section of the mold-holder;

FIG. 4 is a view of the mold-holder closed for injection;

FIG. 4A is a side view of circular plate 7.

FIG. 5 is a view of the mold-holder in its position for releasing the block-holder or other last part, the lower plate and lid remaining under hydraulic pressure;

FIG. 5A is a side view of circular plate 7.

FIG. 6 is a view showing the unlocking of the top lid of the mold-holder;

FIG. 6A is a side view of circular plate 7.

Figure 7:
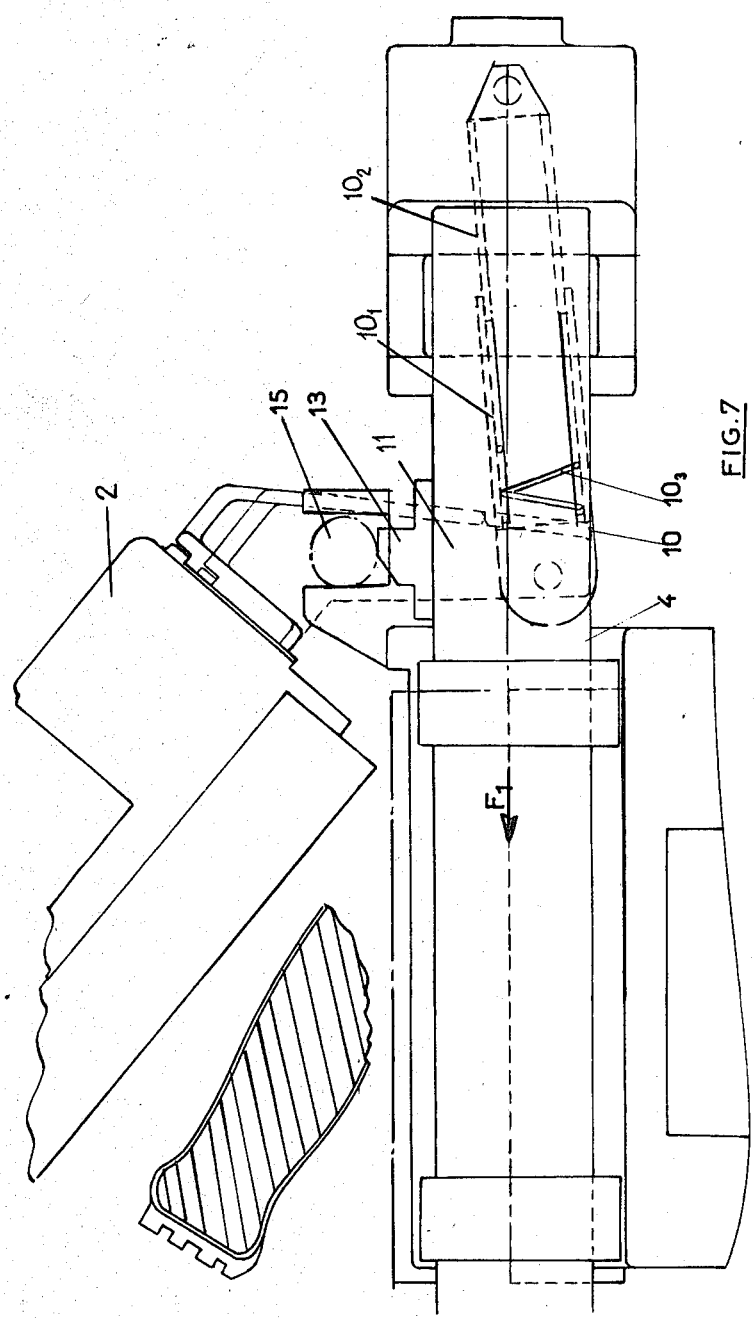
FIG. 7 is a view showing the mold-holder lid in the open position for removing the injected article from the mold.

According to the invention, the mold-holder consists of a lower plate 1, a pivoting lid 2 and a plate 3 for closing the lateral opening of the mold-holder.

In the example of embodiment shown (FIGS. 1 to 7), the mold-holder is equipped for making footwear articles by injecting plastic, rubber or any injectable material.

The closing of the top lid 2 and lateral lid 3 of the mold-holder, is obtained by jacks 6 and 9 ensuring an independent closing action.

Said jacks are nevertheless associated, so that in the closed position of the plate 3 closing the lateral orifice of the mold-holder, the pivoting lid 2 of the lower plate is necessarily kept locked in its closing position.

To this end, the lateral jacks 6 are able to secure the lid 2 of the lower plate 1 of the mold-holder 3, by means of notched circular plates 7 placed at the end of the rods $6_1$ of the jacks 6.

The notched circular plates 7 are angularly orientable in relation to the projecting notches of a notched bore 8, provided on the lateral edges of the lid 2.

For a given angular position, the projecting teeth $7_1$ of the circular plates 7 rest on the projecting teeth $8_1$ of the bores 8, so that when the jacks are moved towards the fixed plate 1 of the mold-holder, the closing and locking of the lid 2 on the fixed plate 1 takes place.

For another given angular position, the projecting teeth $7_1$ of the circular plates 7 are facing the intercalations separating the projecting teeth $8_1$ of the notched bores 8, enabling the unlocking and opening of the lid 2.

The angular displacement of the notched circular plates 7, is obtained by a set of cams 12, arranged on the lateral sides of connecting rods 4 uniting the mobile bridge $5_1$ for applying the closing plate 3 to the lateral orifice of the mold.

The connecting rods 4 are moved by means of a jack 9 placed horizontally in relation to the lateral jacks 6.

The jack 9 is attached to the lateral bottom of the plate 1.

The rod $9_1$ of the jack is mechanically connected to the joining bridge 5 which unites the connecting rods 4.

The jack 9 effects a double action in its stroke: in its end position, opposite the lateral bottom of the mold-holder, it ensures the applying of the mobile plate 3 against the lateral opening of the mold-holder. At the beginning of the reverse stroke, it loosens the mobile plate 3 without unlocking the lateral jacks 6, which enables the plate 3 to be slid vertically in relation to the joining bridge $5_1$ and thus alter the profile of molding.

In this manner, in the example shown (FIG. 1), the closing plate 3 is a block-holder plate able to hold various profiles $3_1$ and $3_2$ enabling the injecting of superimposed coats of texture and/or various colors of molding material for the body of the article. This block-holder is actuated slidably at the right moment by hydraulic or mechanical control according to the stroke corresponding to the distance between the axles of these two consecutive blocks.

At the complete end of the stroke of the jack 9, towards the bridge $5_1$, the mobile closing plate 3 for the lateral opening of the mold-holder is completely disengaged, the lateral jacks assume their angular position for unlocking by the action of the cams 12 and the opening of the lid 2 of the mold-holder can be controlled for removing the injected article from the mold.

The mold-holder is operated as follows:

In the molding position (FIG. 4) the mold-holder is closed, the jack 9 (not shown) is under pressure pulling on the connecting rods 4, in the direction of the arrows $F_2$ so as to hold the bridge $5_1$ against the block-holder plate 3.

The lateral jacks 6 are under pressure, the circular plates 7 of the rods $6_1$ of the jacks 6 are bearing on the projecting teeth $8_1$ of the notched bores 8 provided on each edge of the top lid 2, the means of action, acting on the small rods 10 and 11 for pivotally opening the lid 2, are extended or in the inoperative position.

The pressure applied in the lateral jacks 6 and in the jack 9 for closing the block-holder 3, acts independently for effecting the integral closing of the lid 2 of the mold-holder and block-holder.

In the stage shown (FIG. 5) after a first injection, the changing of the block-holder 3 is shown; to this end, the jack 9 is actuated so as to move the connecting rods 4 in the direction of the arrow $F_1$, which enables the pressure to be released exerted on the block-holder 3, making its vertical displacement possible in relation to the lateral opening of the mold-holder.

In this position, enabling the block-holder to be changed, the lateral jacks 6 are still under pressure, the notched plates 7 of the rods of the jack 6 pressing on the projecting teeth $8_1$ of the notched bores 8 provided on the edges of the lid 2.

After changing the block-holder, the jack 9 is actuated in the direction of the arrows $F_2$ so as to put the block-holder under pressure against the lateral opening of the mold-holder, a second injection can be made, and after injection, the mold-holder is opened, as shown (FIG. 6).

The horizontal jack again acts on the connecting rods 4 in the direction of the arrows $F_1$ up to the end of the stroke of said jack 9.

The block-holder 3 closing the lateral opening of the mold-holder is released.

The connecting rods 4, by means of the lateral cams 12, angularly displace the notched circular plates 7 of the jacks 6, after the latter have been released from hydraulic closing pressure.

The projecting teeth $7_1$ of the circular plates 7, are then in the spaces of the projecting teeth 8, of the notched bores 8 provided in the edges of the lid 2, said lid then resting by its own weight on the lower plate of the mold-holder 1.

The opening of the lid 2 is then possible.

This opening is caused by the cams 13 and 14 arranged on the connecting rods 4, so as to bear respectively by means of their ramps $13_1$ and $14_1$ on the rollers 15 and 16 placed on either side of the longitudinal axis of the lid 2.

The end of stroke of the connecting rods 4 moved by the jack 9 causes the raising of the lid in a plane parallel to the closing plane of the lower plate 1, which enables the centering planes to be disengaged placed between the closing plane of the lid 2 and the closing plane of the lower plate 1. After releasing the lid 2 by the cams 13 and 14, the lid can be pivoted for enabling the injected article to be removed from the mold.

To this end, as shown (FIG. 7), the connecting rods 4 are brought to their end of stroke position in the direction of the arrows $F_1$.

The roller 15 forms the pivoting point of the lid 2 which tips while bearing on the top of the cam 13, by means of the connecting rod 10 acting on the rocking lever 11, which causes the lid 2 to pivot for its opening.

The small rod can be formed of telescopic tubes $10_1$, $10_2$ loaded by spring $10_3$, so that in their maximum compression position, the springs compensate the weight of the lid 2, thus facilitating the operation for opening said lid.

The connecting rods 10 can be controlled by the displacement of the jack 9 which controls the closing and locking of the lid 2, as well as the closing of the block-holder, on the lateral opening of the mold-holder.

The pivoting control of the pivoting lid 2 can be done mechanically, for example, by means of a cam arranged on the frame of a circular molding machine.

We claim:
1. A mold-holder comprising:
  (a) a fixed plate (1) forming a container closed on the bottom, two sides and its inner end, but open on top and on its outer end;
  (b) a top lid (2) adapted to close the top of said plate (1) and being pivotally mounted on the plate (1);
  (c) a lateral lid (3) adapted to move perpendicularly to said outer end of the plate (1) so as to close and open said outer end;
  (d) an end jack (9) adapted to move said lateral lid (3) to and away from the open end of said plate (1);
  (e) lateral jacks (6) at the sides of the mold adapted to move said lid (2) to and away from the top opening of said plate (1);
  (f) locking means (7, 8) for locking and unlocking said jacks (6) to and from said lid (2); and
  (g) connecting means connected between said end jack (9) and locking means (7, 8) whereby movement of said end jack (9) to move said lateral lid (3) to said end opening of said plate (1) causes said lateral jacks (6) to move said lid (2) to said top opening of said plate (1) and to lock with said lid and whereby subsequent movement of said end jack (9) in the other direction will permit the controlled sequence of moving said lateral lid (3) away from the end of said plate (1) while maintaining the lateral jacks (6) locked to the lid (2) and then unlocking the lateral jacks (6) so as to permit them to open said lid (2).

2. The mold-holder of claim 1, in which the lateral lid (3) comprises a slidable mobile plate, said plate comprising several last parts ($3_1$) to be selectively placed in the axis of the article to be molded, for successively injecting one or more thicknesses of material, texture or different colors of material forming part of the object to be molded.

3. The mold-holder of claim 2 in which the mobile plate is held against the lateral opening of the mold by a mobile end bridge ($5_1$) displaceable parallel to the end opening of the plate (1) by means of transmission connecting rods (4) connected to a second bridge (5) actuated for displacement by said end jack (9) situated horizontally opposite to end bridge ($5_1$) of the block-holder mobile plate against the end opening of the plate 1.

4. The mold-holder of claim 3, in which the lateral jacks (6) for applying the pivoting lid (2) to the lower plate (1) of the mold-holder, said locking means comprising a notched circular plate (7) on jack rods ($6_1$) able to bear for an angular position by means of its projecting teeth, on the teeth of a notched bore (8) provided on the edges of a pivoting lid (2), and for another angular position to pass through the projecting teeth of the notched bore (8); said connection means comprising a first set of cams (12), arranged on the connecting rods (4) connecting the end bridge ($5_1$) to the second bridge (5) linked up to the rod of the end jack (9).

5. The mold-holder of claim 4 in which said connection means comprises a second set of cams (13, 14) arranged on the connecting rods (4) for joining the mobile bridges of the mold-holder, so that the lateral jacks (6) are unlocked, the said lid (2) is raised parallel to the lower plate (1) of the mold-holder, for releasing the centering members placed between the lower plate (1) and the pivoting lid (2).

6. The mold-holder of claim 1, in which the lid (2) is pivotable for opening it, by means of a set of connecting rods (10) and (11) actuable by mechanical or hydraulic control.

(References on following page)

References Cited

UNITED STATES PATENTS

| | | | |
|---|---|---|---|
| 1,855,098 | 4/1932 | Collins | 18—17 |
| 2,961,707 | 11/1960 | Stewart | 18—34 |
| 3,128,505 | 4/1964 | Ludwig | 18—42 |
| 3,160,921 | 12/1964 | Ludwig | 18—42 |
| 3,172,154 | 3/1965 | Rollman et al. | 18—17 |
| 3,172,162 | 3/1965 | Senfleben | 18—42 |
| 3,302,243 | 2/1967 | Ludwig. | |
| 3,302,244 | 2/1967 | Ludwig | 18—42 X |
| 3,320,687 | 5/1967 | Leveque | 18—42 X |
| 3,350,748 | 11/1967 | McIlvin | 18—34 |

FOREIGN PATENTS 1,197,872  6/1959  France.

J. HOWARD FLINT, Jr., Primary Examiner

U.S. Cl. X.R.

18—30, 43